United States Patent
Moore et al.

(10) Patent No.: US 6,925,156 B2
(45) Date of Patent: Aug. 2, 2005

(54) PRE-CONNECTION TELEPHONY DATA SYNCHRONIZATION (75) Inventors: Victor S. Moore, Boynton Beach, FL (US); Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 10/324,895

(22) Filed: Dec. 20, 2002

(65) Prior Publication Data

US 2004/0120481 A1 Jun. 24, 2004

(51) Int. Cl.[7] .............................................. H04M 11/00
(52) U.S. Cl. .................................................. 379/93.01
(58) Field of Search .......................... 379/93.01, 92.01, 379/92.03, 106.01; 707/200, 201

(56) References Cited

U.S. PATENT DOCUMENTS

| | | | | |
|---|---|---|---|---|
| 5,999,946 A | * | 12/1999 | Bailis et al. ................. | 707/201 |
| 6,188,695 B1 | * | 2/2001 | Przybysz ................ | 379/221.08 |
| 6,418,200 B1 | * | 7/2002 | Ciccolella et al. ........ | 379/88.18 |
| 2003/0059004 A1 | * | 3/2003 | Jiang et al. ............... | 707/104.1 |
| 2004/0215669 A1 | * | 10/2004 | Mettala et al. ............... | 707/201 |
| 2005/0021571 A1 | * | 1/2005 | East ........................... | 707/201 |

* cited by examiner

*Primary Examiner*—Stella Woo
(74) *Attorney, Agent, or Firm*—Akerman Senterfitt (57) ABSTRACT

A method of transmitting updates to a data requester can include receiving a telephony connectivity request for establishing a telephony voice channel between a data requester and a data source. The data source can be detected based upon the telephony connectivity request. A data synchronizer can ascertain an update time that the data requester last received a data update and can determine a synchronization time that the data source was last synchronized. The data synchronizer can compare the update time and the synchronization time. If the synchronization time occurs after the update time, then the data synchronizer can synchronize the data requester with the data source.

22 Claims, 4 Drawing Sheets

PRE-CONNECTION TELEPHONY DATA SYNCHRONIZATION

BACKGROUND OF THE INVENTION

1. Technical Field

The present invention relates to the field of telecommunications and, more particularly, to pre-connection activities.

2. Description of the Related Art

Numerous consumer devices, such as TiVo®, WebTV, and DirectTV®, can require connectivity to an external source via a telephony line in order to enable certain device features. These consumer devices can often contain information stores that record important events within the consumer device itself. Periodically, the external source can be synchronized with the information store of the consumer device.

For example, some broadcast satellite receivers contain pay-per-view options allowing users to view otherwise restricted programs for a designated price. The broadcast satellite receivers can grant a predetermined amount of paid services without needing external source authorization. Periodically, however, the broadcast satellite receivers utilize telephony lines to update external source records. The receiver can establish a telephony connection with the external data source, thereafter exchanging data across a voice channel utilizing modems attached to both the communicating devices. Accordingly, a customer can be properly charged for services utilized as the external data source information is properly synchronized with the data source.

The aforementioned method, however, can be inefficient. Often, an external source can contact the consumer device only to discover that no change in the information stored within the external device has occurred. Nevertheless, the external source incurred the connectivity expense associated with querying the consumer device. Consumers can become dissatisfied with respect to both the toll costs incurred as well as the usage of their telephone line at unexpected moments.

SUMMARY OF THE INVENTION

The invention disclosed herein provides a method and a system for pre-connection data synchronization. In particular, the invention can include a data synchronizer as a network element within a telephony system. This data synchronizer can receive a connectivity request from a data requester containing a first data store. The data requester can attempt to connect to a data source. The first data store can be updated with information within the data source. More specifically, the data synchronizer can determine if an update has occurred within the data source since the last time the data requester attempted to synchronize data stores. If updates have occurred, the data synchronizer can facilitate a connection between the data requester and the data source. If no updates have occurred, however, the data synchronizer can discourage the establishment of a telephony connection, thusly saving an unnecessary toll charge.

One aspect of the present invention can include a method of transmitting updates to a data requester including receiving a telephony connectivity request for establishing a telephony voice channel between a data requester and a data source. In one embodiment, in addition to the telephony connectivity request, the data synchronizer can receive a digitally encoded signal via a CNG channel specifying a synchronization request. The CNG channel can be a forward channel present between the data requester and a data source through which a facsimile (fax) calling tone (CNG) signal can be conveyed. A FAX CNG signal, as defined by the T0.30 protocol, can be a 1,100 Hz signal continuing for 0.5 seconds and repeated every 3 seconds that signifies an attempt by a calling device to establish a fax call. In a particular embodiment, the CNG channel can have a frequency range of 900–1,300 Hz.

The data synchronizer can detect the data source based upon the telephony connectivity request. Furthermore, the data synchronizer can ascertain an update time that the data requester last received a data update and can determine a synchronization time that the data source was last synchronized. By comparing the update time and the synchronization time, the data synchronizer can determine whether a synchronization connection should be established. If the synchronization time occurs after the update time, then the data synchronizer can synchronize the data requester with information contained within the data source.

In one embodiment, the data synchronizer can determine predefined synchronization options based upon the identity of the data source. Additionally, the data synchronizer can modify at least a portion of the synchronization process responsive to at least one of the predefined synchronization options. In a further embodiment, the data synchronizer can select particular ones of the predefined synchronization options based upon the identity of the data requester.

In another embodiment, during synchronization, the data synchronizer can establish the telephony voice channel connection between the data requester and data source through which digital information can be exchanged. In yet another embodiment, prior to the voice channel being established, the data synchronizer can convey a digital signal via a ringback channel to the data requester specifying update information.

In one embodiment, if the update time occurs after the synchronization time, then prior to the voice channel being established, the data synchronizer can convey a signal via a ringback channel to the data requester. This signal can indicate that the data requester should terminate the connectivity request before a telephony connection is established. In an alternate embodiment, if the update time occurs after the synchronization time, then the data synchronizer can refuse the telephony connectivity request.

Another aspect of the present invention can include a system for synchronizing data between a first data store and a second data store including a synchronization repository and a data synchronizer. The first data store can be associated with a first telephone number and the second data store can be associated with a second telephone number. The synchronization repository can be configured to accept data concerning at least one synchronization event and at least one update event. The synchronization event can include a time at which an attempt to synchronize a first data store to a second data store occurred. The update event can include a time at which a data update to the second data store occurred.

The data synchronizer can be communicatively linked to a telephony network and to the synchronization repository. Moreover, the data synchronizer can be configured to send and receive pre-connection telephony signals specifying synchronization information. In one embodiment, the data synchronizer can be a network element within a telephony network. In another embodiment, the data synchronizer can be a switch independent application. In a particular embodiment, the data synchronizer can include a connection log configured to track synchronization attempts made by the first data store to receive information from the second data store. The data synchronizer can also include an update recorder configured to track updates made to the second data store and a synchronization manager configured to perform at least one synchronization function.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a method and a system for pre-connection data synchronization. In particular, the invention can be utilized within an environment where a data requester communicatively linked to a data source through a telephony network attempts to update internal data to match the data within the data source. Before a telephony connection can be established, a data synchronizer can determine if any updated information within the data source exists that the data requester has not previously accessed. Consequently, if updates have occurred, the data synchronizer can facilitate a connection between the data requester and the data source. Alternatively, if no updates have occurred the data synchronizer can determine that no connection is required thereby saving an unnecessary toll charge.

Figure 1:
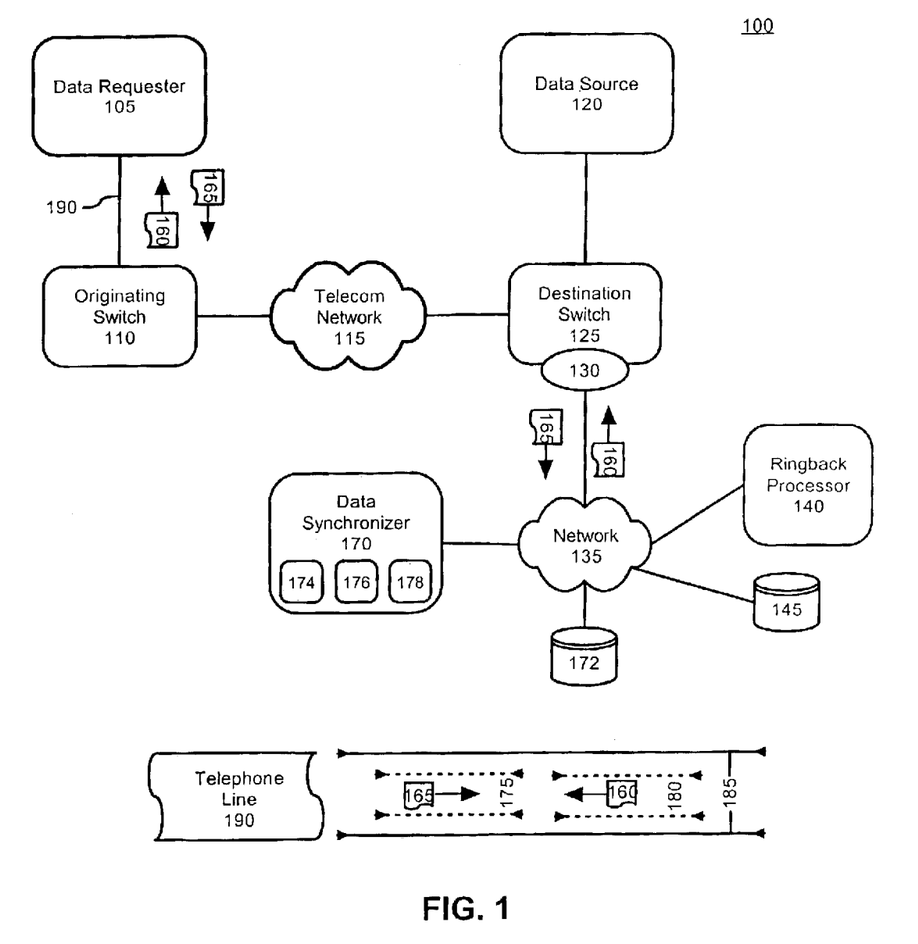
FIG. 1 is a schematic diagram illustrating a telephony system including a data synchronizer in accordance with the inventive arrangements disclosed herein.

FIG. 1 is a schematic diagram illustrating a telephony system 100 which can include a data synchronizer 170 in accordance with the inventive arrangements disclosed herein. As shown in FIG. 1, the system 100 can include an originating switch 110, a telecom network 115, a destination switch 125, a data synchronizer 170, as well as a telephone line 190 showing a ringback channel 180 and a CNG channel 175. The originating switch 110 can be a node within a telephony network that can facilitate the connection between telephony devices, such as telephones and other customer premise equipment.

Notably, switches, such as the originating switch 110 and the destination switch 125, can connect customer premise equipment to the telecom network 115. Hence, the originating switch 110 can connect a data requester 105 to the telecom network 115. Similarly, the destination switch 125 can be a node within the telecom network 115 communicatively linking a data source 120 to the telecom network 115. Since one switch can connect many telephony devices to a given network, both the data requester 105 and the data source 120 can be connected to the same switch. Accordingly, embodiments can exist where the originating switch 110 and the destination switch 125 are the same switch.

The telecom network 115 can be any series of points or nodes connected by a series of interconnection paths capable of connecting the originating switch 110 to the destination switch 125. For example, the telecom network 115 can be a circuit-switched network included within the public switched telephone network (PSTN). In another embodiment, portions of the telecom network 115 can be a commercially owned proprietary packet-switched network with Voice over Internet Protocol (VoIP) capabilities.

The telephone line 190 can be a line that connects a telephony device (customer premise equipment) to the telecom network 115. Physically, the telephone line 190 can include, but is not limited to, such a medium as a twisted pair, a coaxial cable, a fiber optic line, as well as a wireless connectivity pathway. The telephone line 190 can conduct signals within a voice channel 185. The voice channel 185 can be a bandwidth segment, typically 64 kbps, utilized by a telephony network for a single voice connection. The voice channel 185 can operate within the voice band, wherein the voice band can include the frequency range of approximately 0 to 3,400 Hz, which is sufficient bandwidth to convey intelligible human speech. Ordinary telephone service is often restricted to the voice channel 185, while other services, such as a digital subscriber line (DSL) service, can utilize a broader frequency range.

A CNG channel 175 can include a frequency range within the voice band through which a synchronization request 165 can be transmitted. While the CNG channel 175 is always capable of transporting a pre-connection facsimile calling tone (FAX CNG) signal, the exact frequency range available within the CNG channel 175 can vary according to filters within the telephony network having a passband at or around 1,100 Hz. For example, in one embodiment, frequencies below approximately 300 Hz and above approximately 2,400 Hz can be filtered. The resulting CNG channel 175 can include the frequency range from approximately 300 Hz to 2,400 Hz. In another embodiment, frequencies that deviate from the 1,100 Hz frequency (used by the FAX CNG signal according to T 0.30 protocol) by more than 200 Hz are filtered. Accordingly, the CNG channel 175 can include the frequency range from approximately 900 Hz to 1,300 Hz.

In one embodiment, signals within the CNG channel 175 can be digitally encoded by intermittently turning on and off a frequency of about 1,100 Hz, where an "on state" can represent a digital one, and an "off state" can represent a digital zero, or vice versa. In an alternate embodiment, signals within the CNG channel 175 can utilize a modulation technique with a base or carrier frequency of about 1,100

Hz. Furthermore, specific modulation techniques, such as phase key shifting (PKS) and frequency key shifting (FKS), can be used in particular embodiments of the invention. Still, digitally encoded signals can be generated using any of a variety of modulation schemes including, but not limited to, time division multiplexing, frequency modulation, phase modulation, amplitude modulation, and pulse code modulation. Accordingly, the present invention is not limited by the particular data encoding or modulation type. Rather, any suitable data encoding and/or modulation scheme can be used to carry information over the defined telephony channels.

The ringback channel 180 can include a frequency range within the voice channel 185 wherein at least one synchronization response 160 can be conveyed to the data requester 105. The ringback channel 180 can be a back channel through which a ringback signal is ordinarily sent from a telephony switch to a data requester 105. The ringback signal is an intermittent audio tone that the data requester 105 receives after dialing a number, when the distant end of the circuit or the data source 120 is receiving a ringing signal. While the ringback signal is typically an analog signal, the synchronization response 160 can be a digital signal as previously discussion which can be conveyed through the ringback channel 180.

The data synchronizer 170 can be an application capable of determining if updates have been made to the data source 120 since the last update attempt by the data requester 105. If so, the data synchronizer 170 can permit a telephony connection for purposes of updating the data requester 105. If no updates have been made, the data synchronizer 170 can prevent a telephony connection from being established, thereby saving an unnecessary toll charge and telephony connection.

Notably, conveyances of synchronization data to and from the data synchronizer 170 can occur before a telephony voice channel connection is established between the data requester 105 and the data source 120. For instance, the data synchronizer 170 can relay a synchronization response 160 to a data requester 105 via the ringback channel 180 and receive a synchronization request 165 from the data requester 105 via the CNG channel 175. In one embodiment, the data synchronizer 170 can be a network element that interfaces with the destination switch 125 through a gateway 130. In another embodiment, the data synchronizer 170 can be a stand-alone solution interfacing directly with the destination switch 125 without utilizing gateway 130 as an intermediary. In yet another embodiment, the data synchronizer 170 can be a program disposed within the destination switch 125.

According to one aspect of the present invention, the data synchronizer 170 can include a connection log 174, an update recorder 176, and a synchronization manager 178. The connection log 174 can track connection attempts between two endpoints, such as the data requester 105 and the data source 120. Moreover, the connection log 174 can record the parties attempting a connection, whether a connection was established, and a date and time for the connection attempt. The records made by the connection log 174 can be stored within the data synchronizer 170 or within an external data store, such as a synchronization repository 172.

The update recorder 176 can track updates made to a specified data store within a particular device, such as one belonging to the data source 120. It should be noted that the update recorder 176 can receive update information from a number of different sources. For example, in one embodiment, the data source 120 can relay update information to the update recorder 176 via a telephony link. In another embodiment, the update recorder 176 can monitor update notifications posted to a Web site by some external agent. In an alternative embodiment, the update recorder 176 can monitor an Internet accessible data store and track changes made to this data store. As with the connection log 174, the records made by the update recorder 176 can be stored within the data synchronizer 170 or within an external data store, such as a synchronization repository 172.

The synchronization manager 178 can contain synchronization rules and oversee synchronization functions within the data synchronizer 170. For example, in one embodiment, the synchronization manager 178 can establish that any necessary connections between two given endpoints, such as the data requester 105 and the data source 120, should originate from only one of the endpoints, such as the data requester 105. Moreover, the synchronization manager 178 can specify particular responses to synchronization states. For example, in one embodiment, the synchronization manager 178 can send a voice signal to a data requester 105 indicating that no updates have occurred and a connection should not be established. In another embodiment, instead of sending such a message, the synchronization manager 178 can automatically terminate a connectivity request.

Additionally, in a particular embodiment, the behavior of the synchronization manager 178 can be defined by the data source 120. In a further embodiment, the behavior defined by the data source 120 can vary depending on the identity of the data requester 105 attempting to receive updated information. For example, some data requesters may have full access to information within a particular data source, while others only have partial access. Definable settings for the synchronization manager 178 can be stored within the data synchronizer 170 or within another data store, such as a profile repository 145. Accordingly, the profile repository 145 can contain data specifying capabilities and synchronization parameters for a particular data source 120. It should be noted that the profile repository 145 can be a data store internal or external to the data synchronizer 170.

The network 135 can be any series of points or nodes connected by a series of interconnection paths capable of connecting destination switch 125 to the data synchronizer 170 and transporting packet-switched messages between connected nodes. For example, the network 135 can be the Internet. Alternately, the network 135 can be an intranet utilized by a telecom carrier that owns the destination switch 125. Additionally, a gateway 130 can be used to interface between the data synchronizer 170 and the destination switch 125. In one embodiment, the gateway 130 can facilitate switch independent application programming by providing a set of open network application programming interfaces (APIs). These interfaces can translate standardized telephony commands to switch specific ones. Additionally, the gateway 130 can function as a layer of abstraction between a telephony network and an application, providing standardized routines to ease many programming tasks.

For example, in one embodiment, the gateway 130 can be a Parlay gateway capable of interfacing any Parlay compliant application to a Parlay compliant telecom network 115. In another example, the International Business Machines (IBM) Resource Manager, which is commercially available from IBM Corporation of Armonk, N.Y., can provide the call authorizer 170 with value-added services and functions. Hence, in a particular embodiment, the IBM Resource Manager can function as the gateway 130. In yet another embodiment, the gateway 130 can include JAVA APIs for Integrated Networks (JAIN) allowing the call authorizer 170 to be implemented as a switch independent JAIN compliant application.

In operation, the data requester 105 can place a call to the data source 120 through the telecom network 115. The data requester 105 can send a connectivity request through the originating switch 110 across the telecom network 115 to the destination switch 125. Notably, when both the data requester 105 and the data source 120 are connected to the same switch, the connectivity request can be handled directly by that switch, which can function as both the originating switch 110 and the destination switch 125. The destination switch 125 can then send a synchronization inquiry to the data synchronizer 170. In addition to a connectivity request sent by the data requester 105, in particular embodiments, the data requester 105 can send a synchronization request 165 via a CNG channel 175 to the data synchronizer. This synchronization request 165 can contain digitally encoded information specifying synchronization details pertinent to the update desired by the data requester 105.

Upon receiving the synchronization inquiry, the data synchronizer 170 can utilize the connection log 174 to determine when the last update attempt was made. The data synchronizer can also utilize the update recorder 176 to determine when the last update occurred within the data source 120. Based upon these determinations and rules contained within the synchronization manager 178, the data synchronizer 170 can grant or deny the connectivity request. Furthermore, the data synchronizer 170 can transmit a synchronization response 160 to the data requester 105 via a ringback channel 180. The synchronization response 160 can contain information enabling the data requester 105 to make an informed choice on whether to continue the synchronization attempt. In a particular embodiment, the synchronization response 160 can contain update information within it, making the telephony connection with the data source 120 unnecessary.

One of ordinary skill in the art should appreciate that the connection log 174, the update recorder 176, and the synchronization manager 178 need not be discrete elements within the data synchronizer 170. Instead, the data synchronizer 170 can itself perform some or all of the functions of the connection log 174, the update recorder 176, and the synchronization manager 178. Moreover, other combinations of components capable of performing the tasks detailed with reference to the connection log 174, the update recorder 176, and the synchronization manager 178 are contemplated. For example, in one embodiment, an update module can track both connection attempts detailed in the connection log 178 and data updates detailed in the update recorder 176.

While in one embodiment the data synchronizer 170 can convey synchronization data to the data requester 105 without assistance, in another embodiment, a ringback processor 140 can assist in these transmissions. The ringback processor 140 can be an application capable of receiving data and conveying this data as analog and digital signals over the ringback channel 180. The ringback channel 180 can be a segment of telephony bandwidth within the voice frequency range (approximately 0–3,400 Hz) reserved for pre-connection transmissions between a telephony switch and the data requester 105. Typically, an intermittent analog signal representing the ringing of a data source is sent along this ringback channel.

Figure 2:
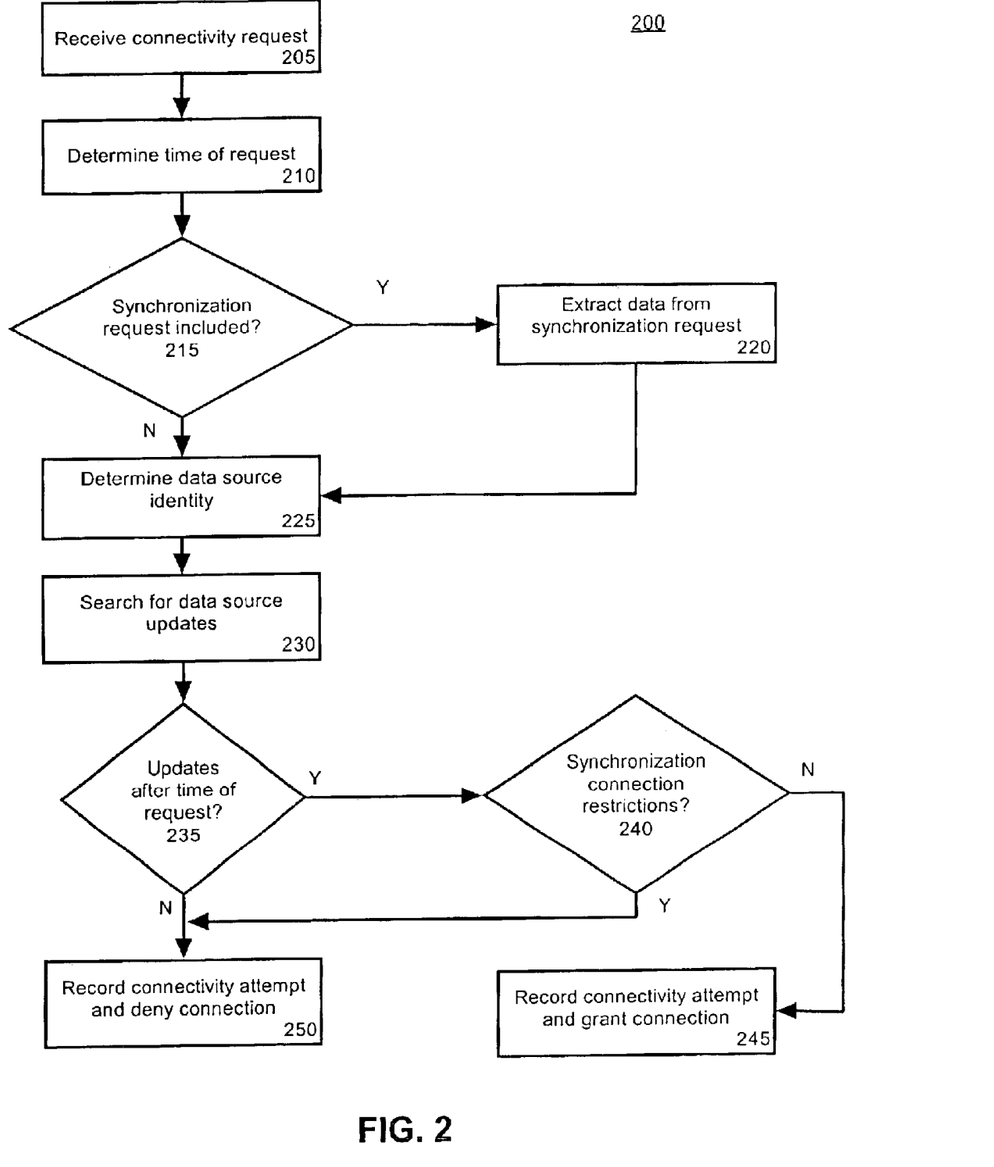
FIG. 2 is a flow chart illustrating a method of implementing a data synchronizer using the system of FIG. 1.

FIG. 2 is a flow chart illustrating a method 200 for utilizing a data synchronizer using the system of FIG. 1. The method 200 can be performed in the context of two devices containing common data connected via a telephony system having an associated phone number. Furthermore, a call originating device can attempt to initiate an update from a call receiving device. In step 205, the, synchronization manager can receive a connectivity request from the data requester. In one embodiment, the data synchronizer can monitor connectivity requests with called phone numbers associated with registered data sources. Accordingly, the data synchronizer can recognize that the connectivity request represents a data synchronization attempt. In step 210, the time of the request can be recorded. This time can be recorded precisely, such as by the second, to facilitate comparisons between the time of request and update events.

In step 215, the data synchronizer can determine if a synchronization request was submitted with the connectivity request. If an accompanying synchronization request exists, the method can proceed to step 220, otherwise the method proceeds directly to step 225. In step 220, data can be extracted from the synchronization request. The synchronization request can be a digitally encoded signal sent via the CNG channel containing supplemental data concerning the synchronization attempt. For example, in one embodiment, the data source can contain multiple data stores and the synchronization request can specify a particular one. In another embodiment, the synchronization request can include an authorization code needed to access information from a restricted data source.

In step 225, the data synchronizer can determine the identity of a data source.

For example, the phone number associated with a particular data source can be used to identify that data source. The data synchronizer can utilize a data repository, such as a profile repository, to look up data source specific information based upon this phone number. In step 230, the data synchronizer can search for data source updates. For example, in one embodiment, the data synchronizer can look in a content database associated with the data source to determine when the last update occurred.

In step 235, the data synchronizer can determine whether any of the updates occurred at a time later than the last synchronization attempt. If not, the method can continue to step 250, where the attempted connection can be recorded in a connection log and the connectivity request can be denied. Otherwise, the method can proceed to step 240 where the data synchronizer can check for synchronization restrictions.

Such restrictions could have been recorded within the profile repository and applied against particular data requesters. If there are restrictions in step 240 that cause a connectivity request to be denied, the method can proceed to step 250. If no synchronization restrictions exist, however, the method can proceed to step 245, where a record of the attempted connection can be recorded and the connection granted. Once the telephony connection has been granted, the data requester can receive information from the data source and synchronize internal data to match the received information.

It should be noted that although the method 200 as shown in FIG. 2 either grants or denies a telephony connection, the invention can perform alternate actions. For example, in one embodiment, the invention can indicate to the data requester the number of updates that have occurred since the last update attempt, thereby allowing the data requester to determine if an update is desirable. In another embodiment, the data requester can receive a pre-defined ringback if no updates exist and a different distinctive ringback if there have been updates since the last ringback. In any case, according to one embodiment of the present invention, the data requester may make the determination concerning the telephony connection instead of having the data synchronizer make the connectivity decision. Notably, the signals sent to the data requester can be analog or digital signals sent through the ringback channel.

Figure 3:
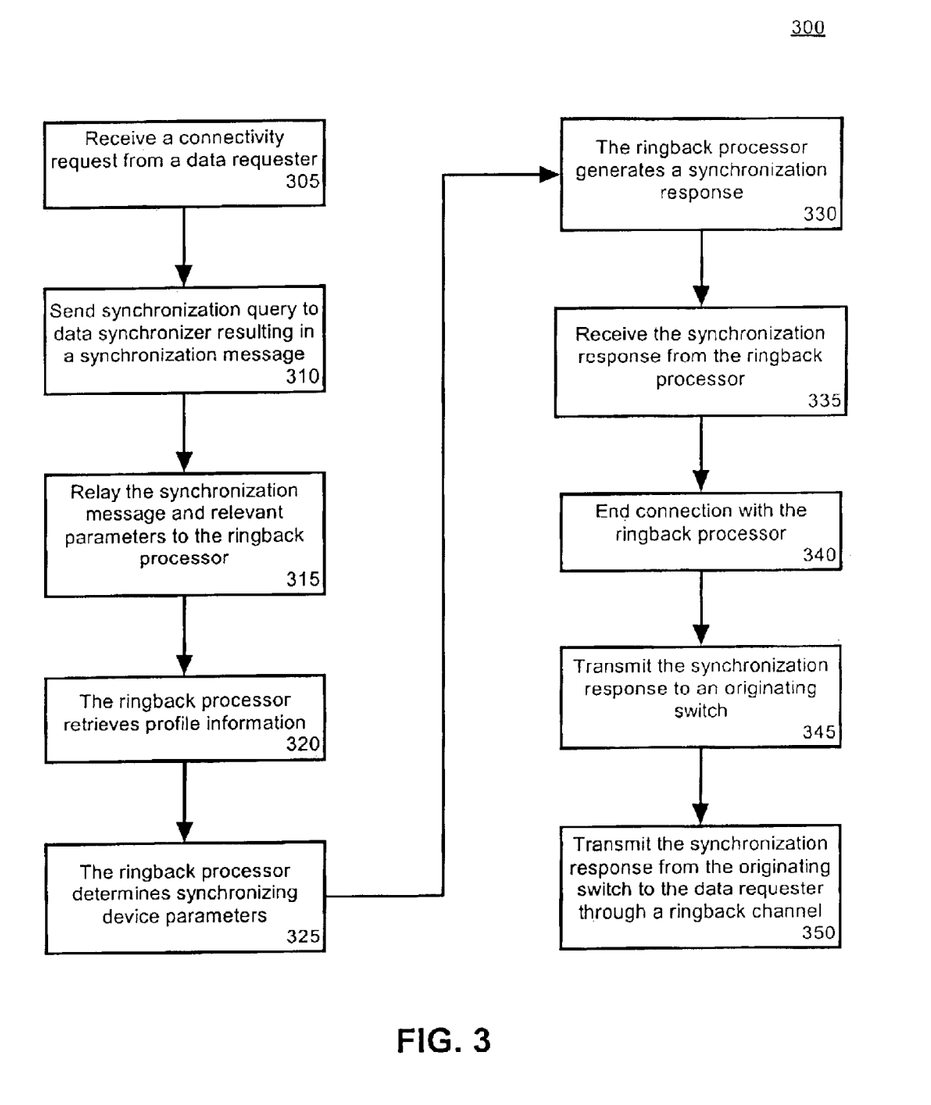
FIG. 3 is a flow chart illustrating a method for utilizing a ringback channel to transmit a synchronization response using the system of FIG. 1.

FIG. 3 is a flow chart illustrating a method 300 for utilizing a ringback channel to transmit a synchronization response using the system of FIG. 1. The method 300 can be performed in the context of an attempted telephony connection. The method 300 begins in a state before a telephony voice channel connection is established between a data requester and a data source. The method assumes that a telephony environment exists where a communication pathway is available to a destination switch through which the destination switch can relay a ringback transmission to the data requester.

The method 300 can begin in step 305, where a destination switch receives a connectivity request from the data requester. While in many cases, the connectivity request will be for a dedicated circuit-switched voice connection, the method can operate equally as well within a packet-switched environment. In step 310, the destination switch can send a synchronization query to the data synchronizer as a result of the received connectivity request. The data synchronizer can first determine if a synchronization attempt is being made. If so, the data synchronizer can determine whether updates have occurred since the last synchronization attempt by the data requester. One method of making this determination was detailed in FIG. 2. In a particular embodiment, the data synchronizer can indicate to the data requester the results of this determination, thereby allowing the data requester to determine whether to continue the connection attempt based on this new information. The content upon which such a decision is based can be contained within a synchronization message generated by the data synchronizer.

In step 315, the synchronization message and relevant parameters can be relayed from the data synchronizer to the ringback processor. The ringback processor can then re-format the synchronization message into a synchronization response and convey this synchronization response to the data requester; a task which the ringback processor begins in step 320. Notably, relevant parameters can include, but are not limited to, data requester identification parameters, data source parameters available to the destination switch, and special processing parameters related to the synchronization message.

In step 320, the ringback processor can retrieve profile information concerning the data source. For example, profile information can include, but is not limited to, such information as the called telephone number, the name of the called party, capabilities of the called device, data source preferences, security requirements for establishing a connection, and unique connection requirements. The profile information can be located in an external data store, can be contained within the ringback processor, or can be contained within parameters passed to the ringback processor.

In step 325, the ringback processor can determine data requester parameters. In one embodiment, the type of synchronization response can be modified according to the capabilities of the hardware of a data requester. For example, some hardware may be able to accept small portions of update information through a ringback channel before a connection is made, while others need to establish a voice channel connection with a data source. Accordingly, if update information is to be conveyed within the synchronization response and if the equipment of the data requester is configured to accept a signal containing digitally encoded information, then a signal containing such information can be generated and sent to the data requester. If different equipment was used that could not accept such an input, then an analog voice signal could be generated and conveyed the data requester indicating that update information exists and that a connection to the data source should be established.

In step 330, the ringback processor can generate a synchronization response. This synchronization response can include analog and/or digital signals. In step 335, the ringback processor can send the synchronization response to the destination switch. Thereafter, in step 340 the connection with the ringback processor can be terminated. In step 345, the ringback transmission can be relayed through the telephony network to the originating switch. Notably, if the data requester and data source are both connected to the same switch, step 345 is unnecessary. In step 350, the originating switch can transmit the synchronization response to the data requester through a designated ringback channel. This ringback channel can be a frequency range within the voice band designated for ringback signals.

It should be appreciated that while the embodiment described in FIG. 3 includes a ringback processor and extensively utilized its capabilities to transmit the synchronization response to the data requester, the invention does not require a separate ringback processor. Instead, the functionality attributed to the ringback processor in FIG. 3 can be incorporated within the data synchronizer.

Figure 4:
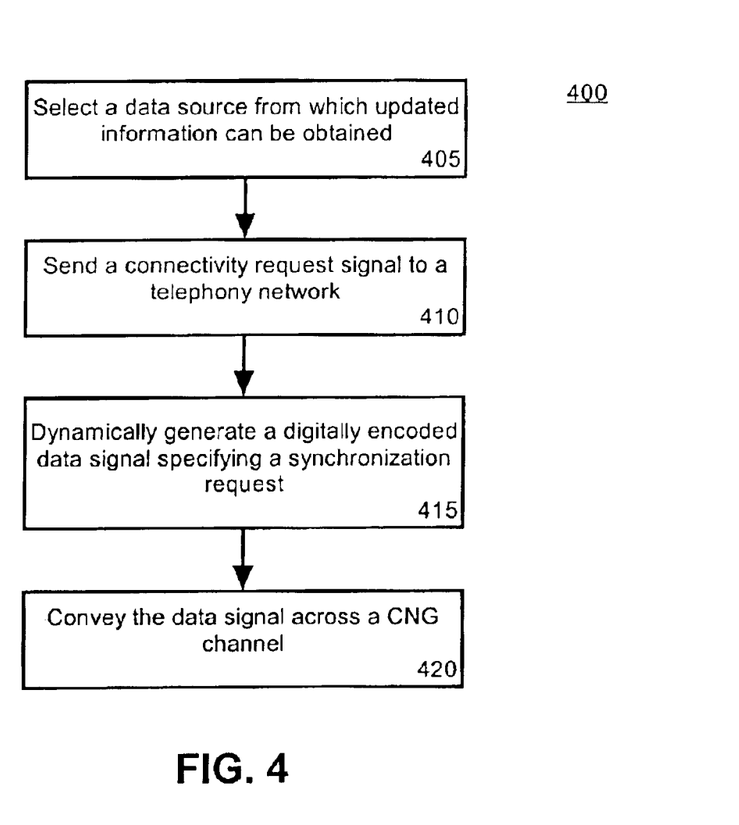
FIG. 4 is a flow chart illustrating a method for utilizing a CNG channel to transmit a synchronization request using the system of FIG. 1.

FIG. 4 is a flow chart illustrating a method 400 for utilizing a CNG channel to send a synchronization request to a data synchronizer using the system of FIG. 1. The method 400 can be performed in the context of pre-connection telephony signaling from a data requester to a data synchronizer. Furthermore, the method 400 presupposes that the data requester submits a synchronization request to the data synchronizer. The method 400 can begin in step 405 where a data requester can select a data source from which updated information can be obtained. This selection process includes selecting a telephone number associated with a particular data source. In step 410, the selected number can be dialed thereby initiating or sending a connectivity request signal to a telephony network from the data source. For example, the connectivity request can be sent to an originating switch through the telecom network to a destination switch.

The method can proceed to step 415, where a digitally encoded data signal can be generate specifying a synchronization request. This synchronization request can contain details pertinent to the update desired by the data requester. In step 420, the method can convey this data signal across a CNG channel. Notably, the conveyance of the data signal, as well as all previously mentioned steps, can occur before a voice connection is established between the synchronizing and data sources. Additionally, the CNG channel across which the data signal is conveyed can be the previously detailed channel including a frequency range centered at or around 1,100 Hz.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of transmitting updates to a data requester comprising the steps of:
    receiving a telephony connectivity request for establishing a telephony voice channel between a data requester and a data source;
    detecting said data source based upon said telephony connectivity request;
    ascertaining an update time that said data requester last received a data update;
    determining a synchronization time that said data source was last synchronized;
    comparing said update time and said synchronization time; and,
    if said synchronization time occurs after said update time, then synchronizing said data requester with said data source.

2. The method of claim 1, said synchronizing step further comprising:
    establishing said telephony voice channel through which digital information can be exchanged.

3. The method of claim 1, said synchronizing step further comprising:
    prior to said voice channel being established, conveying a digital signal via a ringback channel to said data requester specifying update information.

4. The method of claim 1, further comprising the step of:
    if said update time occurs after said synchronization time, then prior to said voice channel being established, conveying a signal via a ringback channel to said data requester indicating that said data requester should terminate said connectivity request before a telephony connection is established.

5. The method of claim 1, further comprising the step of:
    if said update time occurs after said synchronization time, then refusing said telephony connectivity request.

6. The method of claim 2, further comprising the steps of:
    determining predefined synchronization options based upon the identity of said data source; and,
    modifying at least a portion of said synchronizing step responsive to at least one of said predefined synchronization options.

7. The method of claim 6, further comprising the step of:
    selecting particular ones of said predefined synchronization options based upon the identity of said data requester.

8. The method of claim 1, further comprising the step of:
    prior to the establishment of said telephony voice channel, receiving a digitally encoded signal via a CNG channel specifying a synchronization request.

9. The method of claim 8, wherein said CNG channel is within the frequency range of 900–1,300 Hz.

10. A system for synchronizing data between a first data store and a second data store comprising:
    a synchronization repository configured to accept data concerning at least one synchronization event and at least one update event, wherein said synchronization event comprises a time at which an attempt to synchronize a first data store to a second data store occurred, wherein said update event comprises a time at which a data update to said second data store occurred; and,
    a data synchronizer communicatively linked to a telephony network and to said synchronization repository, configured to send and receive pre-connection telephony signals specifying synchronization information, wherein said first data store is associated with a first telephone number and said second data store is associated with a second telephone number.

11. The system of claim 10, wherein said data synchronizer is a network element within a telephony network.

12. The system of claim 10, wherein said data synchronizer is a switch independent application.

13. The system of claim 10, wherein said data synchronizer further comprises:
    a connection log configured to track synchronization attempts made by said first data store to receive information from said second data store;

an update recorder configured to track updates made to said second data store; and, a synchronization manager configured to perform at least one synchronization function.

14. A machine readable storage having stored thereon, a computer program having a plurality of code sections, said code sections executable by a machine for causing the machine to perform the steps of:

receiving a telephony connectivity request for establishing a telephony voice channel between a data requester and a data source;

detecting said data source based upon said telephony connectivity request;

ascertaining an update time that said data requester last received a data update;

determining a synchronization time that said data source was last synchronized;

comparing said update time and said synchronization time; and, if said synchronization time occurs after said update time, then synchronizing said data requester with said data source.

15. The machine readable storage of claim 14, said synchronizing step further comprising:

establishing said telephony voice channel through which digital information can be exchanged.

16. The machine readable storage of claim 14, said synchronizing step further comprising:

prior to said voice channel being established, conveying a digital signal via a ringback channel to said data requester specifying update information.

17. The machine readable storage of claim 14, further comprising the step of:

if said update time occurs after said synchronization time, then prior to said voice channel being established, conveying a signal via a ringback channel to said data requester indicating that said data requester should terminate said connectivity request before a telephony connection is established.

18. The machine readable storage of claim 14, further comprising the step of:

if said update time occurs after said synchronization time, then refusing said telephony connectivity request.

19. The machine readable storage of claim 15, further comprising the steps of:

determining predefined synchronization options based upon the identity of said data source; and, modifying at least a portion of said synchronizing step responsive to at least one of said predefined synchronization options.

20. The machine readable storage of claim 19, further comprising the step of:

selecting particular ones of said predefined synchronization options based upon the identity of said data requester.

21. The machine readable storage of claim 14, further comprising the step of:

prior to the establishment of said telephony voice channel, receiving a digitally encoded signal via a CNG channel specifying a synchronization request.

22. The machine readable storage of claim 21, wherein said CNG channel is within the frequency range of 900–1,300 Hz.

* * * * *